Patented Apr. 5, 1932

1,852,097

UNITED STATES PATENT OFFICE

EMANUEL ANCOT, OF ZWICKAU, GERMANY, ASSIGNOR TO THE FIRM WIEDE'S CARBIDWERK FREYUNG MIT BESCHRÄNKTER HAFTUNG, OF FREYUNG, BAVARIA, GERMANY

SYNTHETIC SPINEL

No Drawing. Application filed January 28, 1929, Serial No. 335,754, and in Germany August 14, 1928.

The preparation of synthetic corundum (crystallization of pure alumina) by Verneuil's process is known (Verneuil, Comptes Rendus 1902, Vol. 135, p. 791, u. ff.). Essentially, this process is carried out in such a manner that the finely powdered and intimately mixed batch-mixture is slowly passed through the flame of an oxy-hydrogen blowpipe, the little droplets formed being accumulated on a support and crystallizing on this support upon cooling.

By the same process spinels consisting of alumina and magnesia and moreover of red, blue, blue-green, dark green and Alexandria kinds have already been prepared.

On the other hand the production of morganite-like rose coloured spinels is not known, morganite being the American name for rose-coloured beryl. The invention consists in the method of preparation of such synthetic spinels and in the new products obtained by this method.

The invention consists in mixing alumina (aluminum oxide) with magnesia in such proportions that a spinel base mixture results, to which for the production of morganite-like rose-coloured spinels out of this base mixture a suitable quantity of iron, as well as small quantities of titanium and beryllium in metallic form or in the form of oxides or other compounds are added, and producing fused drops by the well known Verneuil process. By the admixture of titanium and beryllium or their compounds the shade of colour is graduated.

Spinels of morganite-like pink rose color as produced by the methods described, are not found in nature and are unknown.

Example of process

A spinel base mixture is made of 500 grams of alumina, and 100 grams of magnesia powder, and to this base mixture 10 grams of iron oxide, 0.5 grams of beryllium oxide, 0.2 grams of titanium fluoride are added, and then fused drops are produced. The stone formed has a beautiful rose colour, a high refractive index, a clear transparency, and a bright lustre.

Having now particularly described and ascertained the nature of my said invention, I declare that what I claim is:

1. A spinel base mixture of alumina and magnesia of about 600 parts with approximately 10 parts of an iron compound, 0.5 parts of a beryllium oxide and 0.2 parts of titanium fluoride, all parts being by weight.

2. A synthetic spinel having a pink rose color and made from a composition comprising alumina and magnesia about 600 parts, with approximately 10 parts of an iron oxide, 0.5 parts of beryllium oxide and 0.2 parts of titanium fluoride, all parts being by weight.

3. A spinel base mixture containing the following compounds in about the specified ratio, alumina 500 parts, magnesia 100 parts, iron oxide 10 parts, beryllium oxide 0.5 parts, and titanium fluoride 0.2 parts, all parts being by weight.

4. A synthetic spinel having a pink rose color and made from a composition comprising the following ingredients in about the ratio stated, alumina 100 parts, magnesia 100 parts, iron oxide 10 parts, beryllium oxide 0.5 parts, and titanium fluoride 0.2 parts, all parts being by weight.

In testimony whereof I have hereunto set my hand.

EMANUEL ANCOT.